(12) United States Patent
Klein

(10) Patent No.: US 10,289,477 B2
(45) Date of Patent: May 14, 2019

(54) USB ELECTRONIC MARKER CIRCUIT AND METHOD THEREFOR

(71) Applicant: SEMICONDUCTOR COMPONENTS INDUSTRIES, LLC, Phoenix, AZ (US)

(72) Inventor: Christian Klein, Portland, ME (US)

(73) Assignee: SEMICONDUCTOR COMPONENTS INDUSTRIES, LLC, Pheonix, AZ (US)

(*) Notice: Subject to any disclaimer, the term of this patent is extended or adjusted under 35 U.S.C. 154(b) by 146 days.

(21) Appl. No.: 15/442,858

(22) Filed: Feb. 27, 2017

(65) Prior Publication Data

US 2018/0248356 A1    Aug. 30, 2018

(51) Int. Cl.
| | | |
|---|---|---|
| *G06F 11/00* | (2006.01) | |
| *G06F 11/07* | (2006.01) | |
| *H02H 3/20* | (2006.01) | |
| *G06F 11/30* | (2006.01) | |

(52) U.S. Cl.
CPC ...... *G06F 11/0793* (2013.01); *G06F 11/0745* (2013.01); *G06F 11/3027* (2013.01); *H02H 3/20* (2013.01)

(58) Field of Classification Search
CPC .. G06F 11/27; G06F 11/0745; G06F 11/0793; G06F 11/3027; H02H 3/20; H01R 24/64; H01R 2107/00
See application file for complete search history.

(56) References Cited

U.S. PATENT DOCUMENTS

| | | | | |
|---|---|---|---|---|
| 6,625,761 | B1* | 9/2003 | Sartore | G06F 11/0745 710/100 |
| 2016/0190794 | A1* | 6/2016 | Forghani-Zadeh | H02H 7/20 361/86 |
| 2017/0108910 | A1* | 4/2017 | Goh | G06F 1/266 |
| 2017/0242814 | A1* | 8/2017 | Voor | G06F 1/266 |
| 2017/0271897 | A1* | 9/2017 | Wen | H02H 7/18 |
| 2018/0097318 | A1* | 4/2018 | Golubovic | H01R 13/7137 |
| 2018/0128694 | A1* | 5/2018 | Wee | G01K 7/01 |

OTHER PUBLICATIONS

Gayathri Vasudevan, "Designing USB 3.1 Type-C Cables Using EZ-PD™ CCG2," Document No. 001-95615 Rev. A, Aug. 26, 2015, 22 pages.

* cited by examiner

*Primary Examiner* — Joseph D Manoskey
(74) *Attorney, Agent, or Firm* — Robert F. Hightower

(57) ABSTRACT

An embodiment of an electronic marker circuit for a USB cable may be configured to detect and error condition on one or more of the USB signals and apply a signal to one of the USB signal that is representative of the cable being disconnected from a source or sink device even if the cable is still physically connected.

19 Claims, 4 Drawing Sheets

USB ELECTRONIC MARKER CIRCUIT AND METHOD THEREFOR

BACKGROUND OF THE INVENTION

The present invention relates, in general, to electronics, and more particularly, to semiconductors, structures thereof, and methods of forming semiconductor devices.

The Universal serial bus (USB) has become an accepted mechanism to transfer information or power between two electronic devices. The USB bus was generally implemented as a USB cable that carried USB signals on the USB conductors and with USB connectors at each end of the cable. More recent versions of the specification for the USB bus included electronic marker circuits within one or more of the USB connectors. In certain conditions, the USB signals on the USB bus may not have adhered to the USB specification and may have had an error condition or fault condition that may be outside of the specification. Those fault conditions or error conditions may have caused damage to the electronic devices or may have caused undesirable behavior of the USB signals.

Accordingly, it is desirable to have an electronic marker device that can detect a fault condition, or that can minimize undesirable behavior of the USB signals, or that can reduce damage to the devices.

Figure 1:
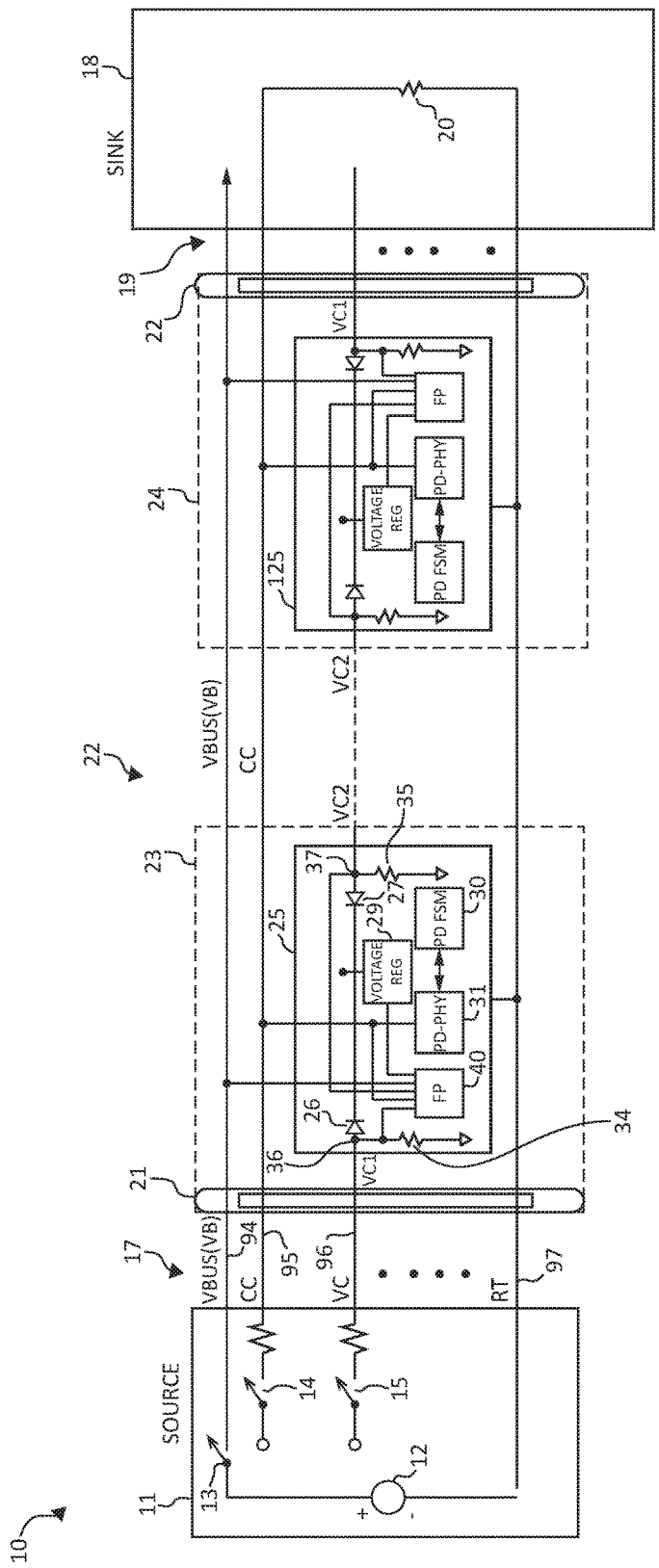
FIG. 1 illustrates, in a general manner, a USB system that includes an electronic marker circuit in accordance with the present invention.

For simplicity and clarity of the illustration(s), elements in the figures are not necessarily to scale, some of the elements may be exaggerated for illustrative purposes, and the same reference numbers in different figures denote the same elements, unless stated otherwise. Additionally, descriptions and details of well-known steps and elements may be omitted for simplicity of the description. As used herein current carrying element or current carrying electrode means an element of a device that carries current through the device such as a source or a drain of an MOS transistor or an emitter or a collector of a bipolar transistor or a cathode or anode of a diode, and a control element or control electrode means an element of the device that controls current through the device such as a gate of an MOS transistor or a base of a bipolar transistor. Additionally, one current carrying element may carry current in one direction through a device, such as carry current entering the device, and a second current carrying element may carry current in an opposite direction through the device, such as carry current leaving the device. Although the devices may be explained herein as certain N-channel or P-channel devices, or certain N-type or P-type doped regions, a person of ordinary skill in the art will appreciate that complementary devices are also possible in accordance with the present invention. One of ordinary skill in the art understands that the conductivity type refers to the mechanism through which conduction occurs such as through conduction of holes or electrons, therefore, that conductivity type does not refer to the doping concentration but the doping type, such as P-type or N-type. It will be appreciated by those skilled in the art that the words during, while, and when as used herein relating to circuit operation are not exact terms that mean an action takes place instantly upon an initiating action but that there may be some small but reasonable delay(s), such as various propagation delays, between the reaction that is initiated by the initial action. Additionally, the term while means that a certain action occurs at least within some portion of a duration of the initiating action. The use of the word approximately or substantially means that a value of an element has a parameter that is expected to be close to a stated value or position. However, as is well known in the art there are always minor variances that prevent the values or positions from being exactly as stated. It is well established in the art that variances of up to at least ten percent (10%) (and up to twenty percent (20%) for some elements including semiconductor doping concentrations) are reasonable variances from the ideal goal of exactly as described. When used in reference to a state of a signal, the term "asserted" means an active state of the signal and the term "negated" means an inactive state of the signal. The actual voltage value or logic state (such as a "1" or a "0") of the signal depends on whether positive or negative logic is used. Thus, asserted can be either a high voltage or a high logic or a low voltage or low logic depending on whether positive or negative logic is used and negated may be either a low voltage or low state or a high voltage or high logic depending on whether positive or negative logic is used. Herein, a positive logic convention is used, but those skilled in the art understand that a negative logic convention could also be used. The terms first, second, third and the like in the claims or/and in the Detailed Description of the Drawings, as used in a portion of a name of an element are used for distinguishing between similar elements and not necessarily for describing a sequence, either temporally, spatially, in ranking or in any other manner. It is to be understood that the terms so used are interchangeable under appropriate circumstances and that the embodiments described herein are capable of operation in other sequences than described or illustrated herein. Reference to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment, but in some cases it may. Furthermore, the particular features, structures, or characteristics may be combined in any suitable manner, as would be apparent to one of ordinary skill in the art, in one or more embodiments. For clarity of the drawings, doped regions of device structures are illustrated as having generally straight line edges and precise angular corners. However, those skilled in the art understand that due to the diffusion and activation of dopants the edges of doped regions generally may not be straight lines and the corners may not be precise angles.

The embodiments illustrated and described hereinafter suitably may have embodiments and/or may be practiced in the absence of any element which is not specifically disclosed herein.

DETAILED DESCRIPTION OF THE DRAWINGS

FIG. 1 illustrates, in a general manner, a USB system 10 that has an embodiment that can detect errors on some of the USB signals. System 10 includes a source device or source 11 that may be connected to a sink device or sink 18 by a USB cable 22. Source 11 can be a charging device or a computer or other device that sources power to cable 22 or to a sink device which is on the other end of cable 22. Examples of different types of sink devices include a mobile phone or some other device that may have a battery, or other types of devices with or without a battery. Cable 22 typically includes a connector 23, illustrated by a dashed box, on one end of the cable and a connector 24, illustrated by another dashed box, at an opposite end of cable 22. Connector 23 may include a plug 21 that mates to a receptacle 17 of source 11 and connector 24 may include a plug 22 that mates to a receptacle 19 of sink 18. Cable 22 typically includes a plurality of conductors that conduct USB signals. The USB signals and corresponding conductors may include a USB power (VBus) signal on a Vbus conductor 94, a configuration channel (CC) signal on a CC conductor 95, a cable plug power (VConn or VC) signal on a VC conductor 96, and a power return (RT) signal on an RT conductor 97. Cable 22 and the USB bus may include various other signals and/or conductors that are not illustrated for simplicity of the drawings.

Source 11 may include a voltage or power source 12 that may be configured to selectively apply a voltage or power to the Vbus signal on conductor 94, such as for example through a switch 13. Source 11 may also be configured to selectively apply a CC signal to conductor 95 via a switch 14 and a resistor. Source 11 may also be configured to apply a VC signal to conductor 96 via a switch 15 and a resistor. Those skilled in the art will appreciate that the configuration channel (CC) signal formed by source 11 on conductor 95 may be terminated at sink 18 with an impedance, such as resistor 20 for example.

Plug 23 may also include an electronic marker circuit 25. Those skilled in the art will understand that an electronic marker circuit, such as circuit 25, may be configured to provide information about the capabilities of cable 22 to either of source 11 or sink 18. For example, circuit 25 may be configured to send information, such as for example packets of information via a specified USB protocol, to source 11 by providing signals that include the information via the CC signal on conductor 95. An input 36 of circuit 25 may be configured to receive the cable plug power (VC) signal from source 11 as a cable plug power signal one (VC1). Circuit 25 may also have an output 37 that may be configured to receive power from another source as a cable plug power signal two (VC2). In some embodiments, the power for the VC signal may be sourced from either of source 11 or sink 18. A termination impedance, such as for example a resistor 35, may be connected to input 36 and another termination impedance, such as for example a resistor 35, may be connected to output 37. Resistors 34 and 35 may, in some embodiments, be optional or may have values that are selected to match certain impedance requirements for cable 22. Optional blocking devices may be coupled to conductor 96 that may prevent a device connected to circuit 25 from damaging circuit 25. In one example embodiment, the blocking devices may include a diode 26 connected between input 36 and circuits within circuit 25 and/or a diode 27 connected to output 37 to be in series between circuits external to circuit 25 and circuits internal to circuit 25. Those skilled in the art will appreciate that the protection devices may be embodied as other circuit elements other than diodes 26 and 27.

A voltage regulator 29 of circuit 25 may be configured to receive power from VC1 or VC2 and provide a regulated voltage for operating the circuits of circuit 25. In some embodiments, regulator 29 may optionally be configured to receive power from the USB power (Vbus) signal on conductor 94. Circuit 25 may also be configured to provide a communication interface to source 11 and respond to the USB communication protocol in order to identify the capabilities of cable 22 to source 11, and to provide other information as required by the USB specification. For example, circuit 25 may include a finite state machine (FSM) circuit 30 that provides the logical processing of information and may also include a physical interface circuit or driver circuit 31 that adheres to the physical and signal level requirements of the USB specification. Those skilled in the art will appreciate that plug 24 may also include an optional electric marker circuit 125 that is substantially similar to circuit 25 except that circuit 125 is on an opposite end of cable 22 and may be connected to sink 18. However, cable 22 may be reversed so that circuit 125 may be connected to source 11. In some embodiments, circuit 125 may be omitted.

Circuit 25 also includes a fault protection (FP) circuit 40 that is configured to detect a fault condition or an error condition on one or more of the USB signals of cable 22. For example, circuit 40 may have an embodiment that may be configured to detect an overvoltage condition of the Vbus signal, or an overvoltage condition of the VC signal, or an overvoltage condition of the CC signal. Circuit 40 may also be configured to provide a signal on one or more of the USB bus conductors to indicate to source 11 that cable 22 has been disconnected even if cable 22 is still physically connected to source 11. For example, circuit 40 may include a circuit configured to directly apply a signal to the CC signal indicating to source 11 that cable 22 has been disconnected even if cable 22 is still physically connected to source 11. Circuit 25 may also be configured to detect other fault conditions or error conditions as will be seen further hereinafter.

Figure 2:
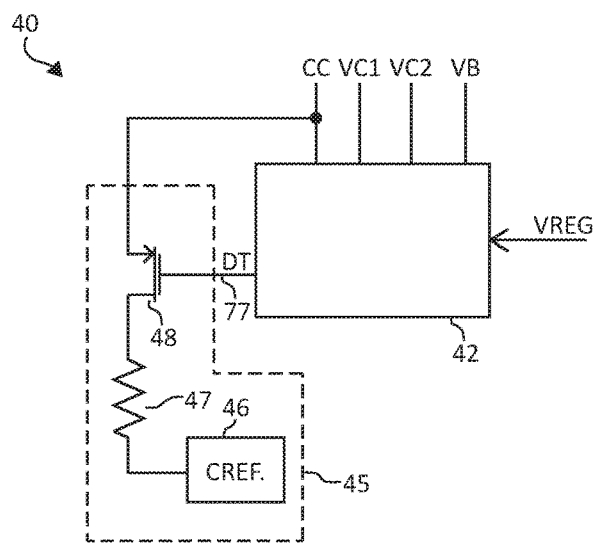
FIG. 2 schematically illustrates a portion of an example of an embodiment of a fault protection circuit that may be a portion of the electronic marker circuit of FIG. 1 in accordance with the present invention.

FIG. 2 schematically illustrates a portion of an example of an embodiment of circuit 40. Circuit 40 may include a fault detection circuit 42 and a fault control circuit 45. Circuit 40 may be configured to receive operating power to operate circuit 40 from an output of regulator 29. Circuit 42 may be configured to detect a fault condition or error condition on one or more of the signals of the USB bus and provide a detection (DT) signal 77 that indicates detection of the error condition. For example, circuit 40 and circuit 42 may be configured to detect that the voltage on the VBus signal is greater than a voltage threshold value, or that the CC signal has a value that is greater than the maximum threshold value for the CC signal, or that the VC signal may have a value that is greater than a maximum threshold value for the VC signal or the VC1 or VC2 signals, or that circuit 40 has detected an over-temperature condition that may be an over-temperature condition in the cable plug or representative of an error condition in the system such as faulty cable conductors, damaged cable connectors, etc., Other USB bus signals on which an error condition may be detected may include, signals generally known as the USB signals commonly referred to as SBU1, SBU2, D−, D+, TX1+, TX1−, TX2+, TX2−, RX1+, RX1−, RX2+, RX2−, etc.

Circuit 45 may be configured to drive the CC signal to a value that is representative of the USB bus being disconnected from source 11 or alternately from sink 18. For example, circuit 45 may include a switch, illustrated as a transistor 48, that is configured to couple a signal to the CC signal that is greater than a disconnect threshold value of the CC signal. Circuit 40 may an embodiment that is configured to directly apply a signal to the CC signal that is greater than a disconnect threshold value of the CC signal while cable 22 is still connected to source 11. A voltage reference circuit or CRef circuit 46 may be configured to provide a voltage that is greater than the disconnect threshold voltage of the CC signal. Transistor 48 may be connected to receive the reference voltage from CRef 46 through a resistor 47.

In an example of an operational embodiment, circuit 42 may assert signal 77 in response to detecting the error condition. The asserted DT signal 77 enables transistor 48 to couple the voltage from CRef 46 to the CC signal. In one example embodiment, the value of the disconnect threshold voltage may be approximately two and three quarters volts (2.75V), and the value of the voltage applied to the CC signal by circuit 45 is greater than this disconnect threshold voltage. In other embodiments the disconnect threshold voltage may be other values. For example in one embodiment the disconnect threshold voltage may be approximately 1.65 volts.

Figure 3:
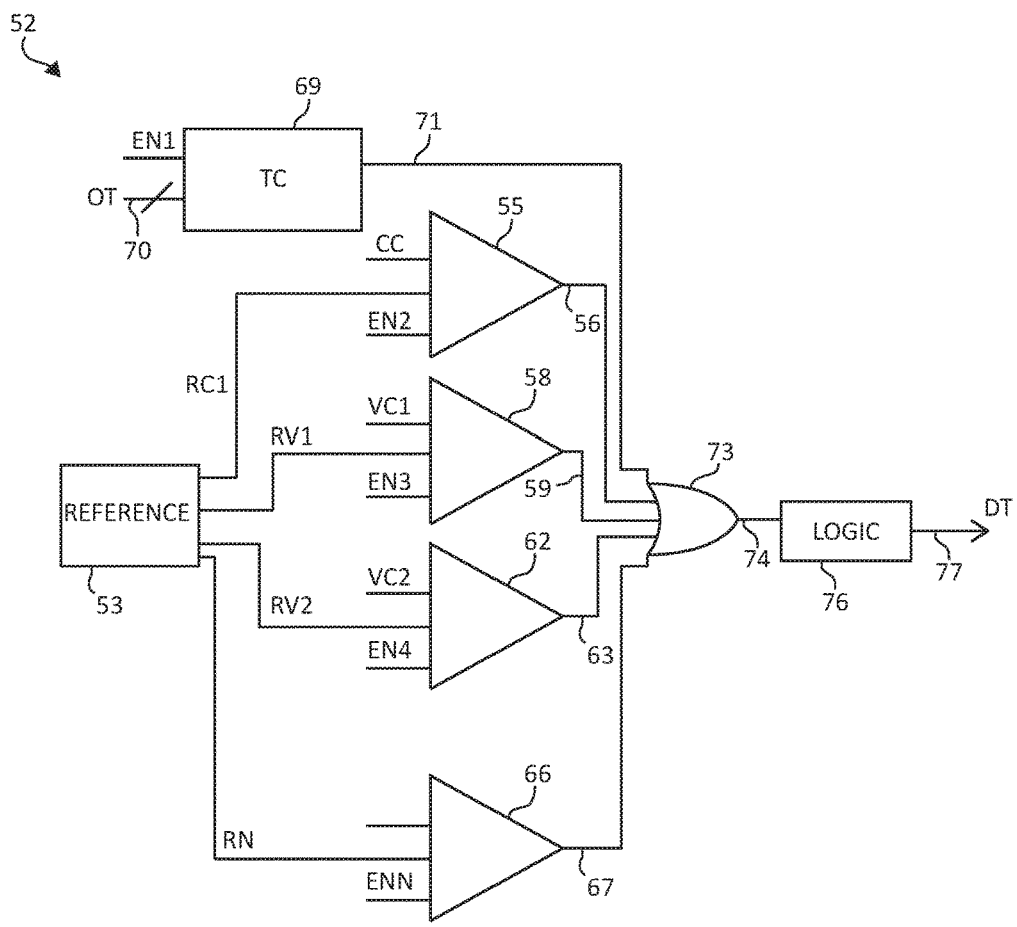
FIG. 3 schematically illustrates a portion of an example of an embodiment of a fault detection circuit that may be a portion of the fault protection circuit of FIG. 2 in accordance with the present invention.

FIG. 3 schematically illustrates an example of a portion of an embodiment of a fault detection circuit 52 that may be an alternate embodiment of circuit 42 (FIG. 2). Circuit 52 may include a reference generator circuit or reference 53 that is configured to provide a plurality of reference signals wherein each reference signal is representative of a value of an error threshold for the corresponding bus signal. For example, reference 53 may be configured to form a first reference signal RC1 that is representative of an error condition of the CC signal, a second reference signal RV1 that is representative of an error addition of the VC1 signal, a third reference signal RV2 that is representative of an error condition of the VC2 signal, or a fourth reference signal RN that is representative of an error condition of another signal on the USB bus. A comparator 55 of circuit 52 may be configured to receive the first reference signal RC1 and the CC signal and provide an output 56 that is representative of the CC signal having a value that forms the error condition, such as for example a voltage that is greater than the maximum threshold value for the CC signal specified by the USB specification. In one example embodiment, the error value may be a CC signal value greater than approximately five and a half volts (5.5V). A comparator 58 of circuit 52 may be configured to receive the second reference signal RC2 and the VC1 signal and provide an output 59 that is representative of the VC1 signal having a value that forms an error condition, such as for example a voltage that is greater than the maximum VC1 threshold value specified by the USB specification. In one example embodiment, the error value may be a VC1 signal value greater than approximately five and a half volts (5.5V). A comparator 62 of circuit 52 may be configured to receive the third reference signal RC3 and the VC2 signal and provide an output 63 that is representative of the VC2 signal having a value that forms an error condition, such as for example a voltage that is greater than the maximum VC2 threshold value specified by the USB specification. In one example embodiment, the error value may be a VC2 signal value greater than approximately five and a half volts (5.5V). A comparator 66 may be configured to receive the Nth reference signal RN and another signal from the USB bus and provide an output 67 that is representative of that other signal having a value that forms an error condition, such as for example a voltage that is greater than the voltage specified by the USB specification.

An embodiment of comparators 55, 58, 62, and 66 may also to include respective enable signals EN2, EN3, EN4, and ENN that may be asserted to enable the respective comparators to detect the respective error conditions and negated to prevent the respective comparators from detecting the respective error condition, thus forcing the comparator outputs to a negated state. In some embodiments, the threshold value for the error condition may be programmable, as will be seen further hereinafter. For example, in an embodiment a value of the reference signal may be programmable.

Circuit 52 may also have an embodiment that is configured to either receive an over-temperature (OT) signal 70 from another part of circuit 25 or alternately from another circuit external to circuit 25. A temperature control (TC) circuit 69 may receive signal 70 and assert an output 71 in response to receiving an asserted state of the over-temperature signal. Circuit 69 may also receive an enable signal (EN1) that may be asserted to enable circuit 69 to process signal 70 or negated to prevent circuit 69 from processing signals 70. In some embodiments, circuit 69 may be implemented as an AND gate.

An OR gate 73 may be configured to receive the outputs of one or more of circuit 69 and comparators 55, 58, 62, and 66 and assert an error signal 74 in response to an asserted state of one of signals 56, 59, 63, 67, or 71. An optional logic circuit 76 of circuit 52 may be configured to receive error signal 74 and responsively forms detection (DT) signal 77. An embodiment of circuit 76 may be configured to assert signal 77 for a detection time interval so that circuit 45 will responsively drive the CC signal for the detection time interval. In another embodiment, circuit 76 may be configured to receive the asserted state of signal 74 and may not assert signal 77 until determining that an assertion of signal 74 was not a transient signal. For example, circuit 76 may have an embodiment that may filter signal 74 to filter out transients and not assert signal 77 unless signal 74 remains asserted and is not a transient. In other embodiments, circuit 76 may include a debounce circuit that receives signal 74 and does not assert signal 77 unless signal 74 remains asserted longer than a debounce time interval. In some embodiments, the filter may filter out transients of signal 74 that do not last for more than a time interval that may be substantially the same as the debounce time interval. In some embodiments, the detection time interval may be no less than approximately twenty-five milli-seconds (25 ms.). An embodiment may include that the debounce time interval may be approximately five to approximately ten milliseconds (5-10 msec.) depending on the fault condition.

In operation, circuit 52 detects one of the error conditions and responsively asserts signal 77. Circuit 45 receives the asserted signal 77 and drives the CC signal during the disconnect time interval with a voltage that is greater than the disconnect threshold voltage of the CC signal. According to the USB specification, when source 11 receives the CC signal with a voltage that is greater than the disconnect threshold voltage, source of 11 should be configured to remove voltage from the USB power (VBus) signal and to may also remove power from the cable plug power (VC) signal. Thus, applying the signal to the CC signal that is greater than the disconnect threshold value may eventually remove power from cable 22 and circuit 25 thereby minimizing damage to source 11 and cable 22, and alternately minimizing damage to sink 18.

Figure 4:
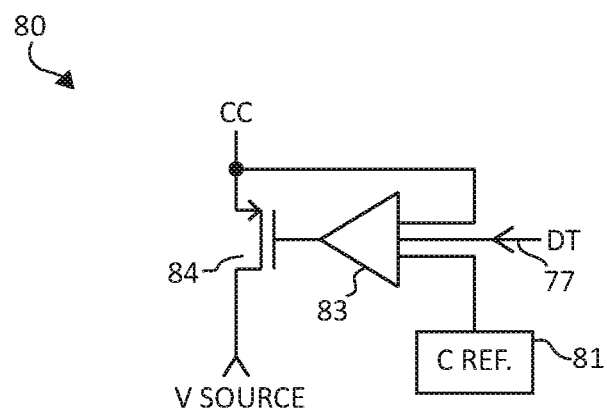
FIG. 4 schematically illustrates a portion of an example of an embodiment of a fault control circuit that may be an alternate embodiment of a portion of the fault protection circuit of FIG. 2 in accordance with the present invention.

FIG. 4 schematically illustrates a portion of an example of an embodiment of a fault control circuit 80 that may be an alternate embodiment of circuit 45 (FIG. 2). Circuit 80 includes an amplifier 83 having an output connected to a transistor 84. Amplifier 83 is configured to be enabled in response to an asserted state of signal 77. After being enabled, amplifier 83 controls transistor 84 to form a voltage and apply the voltage to the CC signal, and controls the voltage to be substantially equal to the value from a C reference generator or CRef 81. The value of the reference voltage formed by CRef 81 is greater than the disconnect threshold value of the CC signal.

Figure 5:
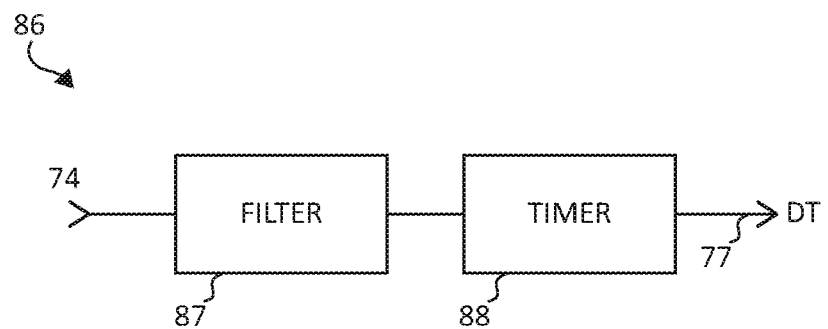
FIG. 5 schematically illustrates a portion of an example of an embodiment of a logic circuit that may be a portion of the fault detection circuit of FIG. 2 or FIG. 3 in accordance with the present invention.

FIG. 5 schematically illustrates a portion of an example of an embodiment of a logic circuit 86 that may be an alternate embodiment of circuit 76 (FIG. 3). Circuit 86 may be configured to include a suppressor circuit 87 and a timer circuit 88. Circuit 87 forms an asserted output in response to receiving an asserted state of signal 74 and after minimizing the chance that the assertion is a transient signal. s Circuit 88 receives the asserted output from circuit 87 and asserts signal 77 for no less than the detection time interval. In some embodiments, circuit 89 may be configured to maintain the asserted state of signal 77 for a time interval that is longer than the detection time interval. Those skilled in the art will appreciate that circuit 86 may have other implementations including an oscillator and counters, as long as the circuit forms the detection time interval and the optional reduction of transients. In one embodiment, circuit 87 may be a filter as described hereinbefore, or alternately may be a debounce circuit as described hereinbefore.

Figure 6:
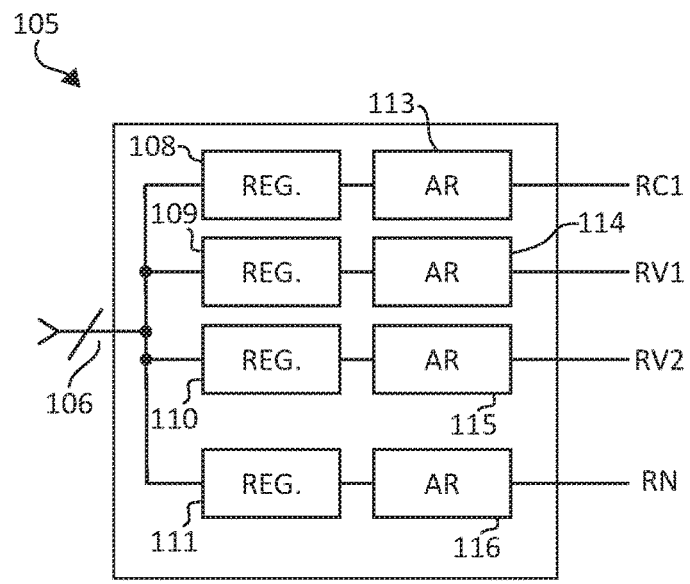
FIG. 6 schematically illustrates a portion of an example of an embodiment of a reference circuit that may be a portion of the fault detection circuit of FIG. 2 or FIG. 3 in accordance with the present invention.

FIG. 6 schematically illustrates a portion of an example of an embodiment of a programmable reference circuit 105 that may be an alternate embodiment of circuit 53 (FIG. 3). Circuit 105 includes an input 106 that may be configured to receive information used to control the value of the reference signals formed by circuit 105. For example, input 106 may be connected to receive information from the finite state machine 30 (FIG. 1) of circuit 25. In some embodiments, input 106 may be a bus that may receive address and data information for operating circuit 105. Some embodiments of input 106 may include a plurality of signal lines such as those found in a signal bus. Circuit 105 may also include a plurality of storage locations and associated logic that may be configured to receive and store the information received from input 106. For example, circuit 105 may include a plurality of registers (Reg.) 108-111 that may be used for storing the information and may also include logic and other control circuitry to decode the information. A plurality of adjustable reference circuits 113-116 may be configured to receive control information from the corresponding register and adjust the value of the reference signal formed by the adjustable reference circuit in response to the control signal.

In order to facilitate the hereinbefore described functionality, circuit 40, and alternately circuit 42, may have a first input connected to receive the voltage from regulator 29, a second input connected to receive the VBus signal, a third input connected to receive the VC2 signal, the fourth input connected to receive the VC1 signal, a fifth input connected to receive the CC signal, and an output configured to form signal 77. Circuit 45, thus circuit 40, may include a transistor 48 having a gate connected to receive signal 77, a source connected to the CC signal and a drain coupled to receive the reference voltage from CRef 46 through resistor 47. Circuit 69, thus circuit 52, may have an input connected to receive the EN1 signal, another input connected to receive signal 70, and an output configured to form signal 71. Comparator 55 may have a first input connected to receive the CC signal, a second input connected to reference 53 receive the RC1 reference voltage, a third input connected to receive the EN2 signal, and an output configured to form signal 56. Comparator 58 may have a first input connected to receive the VC1 signal, a second input connected to reference 53 to receive the RV1 signal, a third input connected to receive the EN3 signal, and an output configured to form signal 59. Comparator 62 may have a first input connected to receive the VC2 signal, a second input and acted to reference 53 to receive the RV2 reference signal, a third input connected to receive the EN4 signal, and an output configured to form signal 63. Comparator 66 may have a first input connected to receive a signal from the USB bus, a second input connected to reference 53 to receive the RN reference signal, a third input connected to receive the ENN signal, and an output configured to form signal 67. Gate 73 may have a first input connected to the output of circuit 69 to receive signal 71, a second input connected to the output of comparator 55 to receive signal 56, a third input connected to the output of comparator 58 to receive signal 59, a fourth input connected to the output of comparator 62 to receive signal 63, a fourth input connected to the output of comparator 66 to receive signal 67, and an output configured to form signal 74. Circuit 76 may have an input connected to the output of gate 73 to receive signal 74, and an output to form signal 77. Circuit 80 may have an output connected to conductor 95 in order to drive the CC signal. Amplifier 83 of circuit 80 may include a first input connected to conductor 95 to receive the CC signal, a second input connected to receive signal 77, a third input connected to CRef 81 to receive the reference signal, and an output connected to a gate of transistor 84. Transistor 84 may have a source connected to conductor 95, and a drain connected to receive a voltage from a voltage source. Circuit 86 may have an input connected to receive signal 77, and circuit 87 may also have an input connected to receive signal 77. An output of circuit 87 may be connected to an input of circuit 88. An output of circuit 88 may be configured to form signal 77.

Circuit 105 may include an input 106 that may be connected to an input of registers 108-111. An output or register 108 may be connected to an input of circuit 113 which may have an output configured to form signal RC1. An output of register 109 may be connected to an input of circuit 114 which may have an output configured to form signal RV1. An output of register 110 may be connected to an input of register 115 which may have an output configured to form signal RV2. Register 111 may have an output connected to an input of register 116 which may have an output configured to form signal RN.

Figure 7:
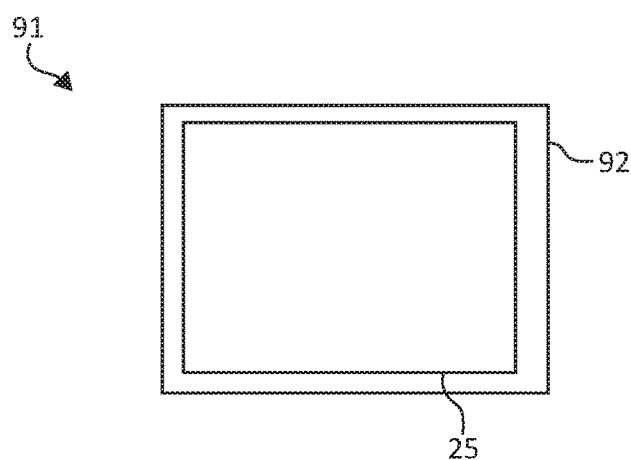
FIG. 7 illustrates an enlarged plan view of a semiconductor device that includes the fault protection circuit of any or all of FIG. 2 or FIG. 3 or FIG. 4 in accordance with the present invention.

FIG. 7 illustrates an enlarged plan view of a portion of an embodiment of a semiconductor device or integrated circuit 91 that is formed on a semiconductor die 92. In an embodiment, circuit 25 or circuit 40 may be formed on die 92. Die 92 may also include other circuits that are not shown in FIG. 6 for simplicity of the drawing. The device or integrated circuit 91 may be formed on die 92 by semiconductor manufacturing techniques that are well known to those skilled in the art.

From all the foregoing, one skilled in the art will understand that an embodiment of an electronic marker circuit may comprise:

a set of conductors including a first conductor configured to receive a USB power signal, such as for example signal Vbus, a second conductor configured to receive a configuration channel signal, such as for example the CC signal, and a third conductor configured to receive a common voltage return signal, such as for example the RT signal;

a connector, such as for example connector 21, configured to support the set of conductors;

an electronic marker circuit, such as for example circuit 25, within the connector and coupled to the set of conductors, the electronic marker circuit configured to detect an error condition of one of the USB power signal or the configuration channel signal and responsively apply a voltage to the configuration channel signal that is greater than a disconnect threshold voltage of the configuration channel signal.

Another embodiment of the electronic marker circuit may include a fault control circuit configured to apply the voltage that is greater than at least one-half the value the USB power signal that is applied to the first conductor during normal operation of the USB cable.

An embodiment may include a fault control circuit configured to apply the voltage that is greater than at least two and three-quarters of a volt (2.75 V).

In an embodiment, the electronic marker circuit may include a fault control circuit, such as for example circuit 40, having a transistor, such as for example transistor 48 or 84, with a source coupled to a signal that is representative of the configuration channel signal, a drain coupled to a voltage source, and a gate coupled to enable the transistor in response to the fault control circuit detecting the error condition.

Another embodiment may be configured to apply the voltage to the configuration channel signal for a first time interval that last as least two milli-seconds.

In an embodiment, the first time interval may be at least twenty-five milli-seconds.

An embodiment may include that the error condition may be one of the USB power signal having a value that is less than a voltage threshold value, the configuration channel signal having a value that is greater than a first maximum threshold value, a cable power signal, such as for example the VC signal, having a value that is greater than a second maximum threshold value or an over-temperature condition.

Those skilled in the art will also appreciate that a method of forming an electronic marker circuit for a USB connector may comprise:

forming a fault protection circuit to detect a fault condition on a conductor of a USB cable; and configuring the fault protection circuit to apply first signal to a configuration channel signal, such as for example the VC signal, of the USB bus in response to the fault protection circuit detecting the fault condition, wherein the first signal is representative of a disconnected condition of the USB bus.

Another embodiment of the method may include forming the fault protection circuit to include a fault detection circuit that is configured to detect the fault condition as one of an over-temperature condition, an overvoltage condition of the configuration channel signal, an overvoltage condition of a USB power signal, or an overvoltage condition of a cable plug power signal.

An embodiment may also include forming the fault protection circuit to include a fault control circuit configured to drive the configuration channel signal with the first signal in response to the fault detection circuit detecting the fault condition.

An embodiment may include configuring the fault protection circuit to apply the first signal as one of a voltage that is greater than 2.75 volts or another voltage that is greater than 1.65 volts.

The method may have an embodiment that may include configuring the fault protection circuit to form a first time interval, such as for example the debounce time interval, after detecting the fault condition and to subsequently apply the first signal for a second time interval after expiration of the first time interval.

An embodiment may also include configuring the fault protection circuit to form the second time interval to be greater than the first time interval and no less than 25 milli-seconds.

Those skilled in the art will appreciate that an embodiment of an electronic marker circuit may comprise:

one or more inputs configured to receive one or more signals from a USB bus;

a first input of the one or more inputs configured to receive a configuration channel signal, such as for example the CC signal, of the one or more signals from the USB bus; and a fault protection circuit configured to drive the configuration channel signal to a value that is greater than a disconnect threshold value of the configuration channel signal, the fault protection circuit configured to drive the configuration channel signal to the value in response to the fault protection circuit detecting a fault condition of the one or more signals from the USB bus.

An embodiment may include a fault detection circuit configured to receive one or more of the signals from the USB bus and detect the fault condition as one of an over-temperature condition, an overvoltage condition of the configuration channel signal, an overvoltage condition of a USB power signal, or an overvoltage condition of a cable plug power signal.

In an embodiment, the fault protection circuit may be configured to form a first time interval, such as for example the debounce time interval, after detecting the fault condition and, after expiration of the first time interval, to subsequently drive the configuration channel signal to the value for a second time interval, such as for example the detect time interval, that is greater than the first time interval.

An embodiment may include that the fault protection circuit may be configured to substantially continuously drive the configuration channel signal to the value for no less than 25 milli-seconds.

In an embodiment, the fault protection circuit may be configured to substantially continuously drive the configuration channel signal to the value until a USB power signal is removed from the fault protection circuit.

Another embodiment may include that the fault protection circuit may include a transistor having a first current carrying electrode coupled to receive a voltage that is no less than the value, a second current carrying electrode coupled to the configuration channel signal, and a control electrode coupled to receive a signal that is representative of the fault protection circuit detecting the fault condition.

Another embodiment of the fault protection circuit may include a programmable reference circuit, such as for example circuit 105.

In view of all of the above, it is evident that a novel device and method is disclosed. Included, among other features, is forming electronic marker circuit for a USB bus wherein the circuit detects an error condition and applies a signal to one of the USB conductors that is representative of the cable being disconnected even if the cable is not disconnected. Providing the signal that is representative of the disconnected condition should result in the removing power from the cable and from any sink device connected thereto. Thus applying the signal can minimize damage to the circuits. Also, utilizing an existing USB signal and conductor does not require adding an extra conductor and thereby may reduce costs.

While the subject matter of the descriptions are described with specific preferred embodiments and example embodiments, the foregoing drawings and descriptions thereof depict only typical and non-limiting examples of embodiments of the subject matter and are not therefore to be considered to be limiting of its scope, it is evident that many alternatives and variations will be apparent to those skilled in the art. As will be appreciated by those skilled in the art, the example form of circuits 40 are used as a vehicle to explain the operation method of detecting the error condition and to forming a signal to represent a disconnected cable. Circuit 40 may be configured with various other embodiments in addition to the preferred embodiment illustrated in FIG. 2 as long as the circuit detects the error condition and drives or applies a signal to one of the USB signal that is representative of a cable being disconnected even if the cable is still physically connected.

As the claims hereinafter reflect, inventive aspects may lie in less than all features of a single foregoing disclosed embodiment. Thus, the hereinafter expressed claims are hereby expressly incorporated into this Detailed Description of the Drawings, with each claim standing on its own as a separate embodiment of an invention. Furthermore, while some embodiments described herein include some but not other features included in other embodiments, combinations of features of different embodiments are meant to be within the scope of the invention, and form different embodiments, as would be understood by those skilled in the art.

The invention claimed is:

1. A USB cable comprising:
a set of conductors including a first conductor configured to receive a USB power signal, a second conductor configured to receive a configuration channel signal, and a third conductor configured to receive a common voltage return signal;
a connector configured to support the set of conductors; and
an electronic marker circuit within the connector and coupled to the set of conductors, the electronic marker circuit configured to detect an error condition of one of the USB power signal or the configuration channel signal and responsively apply a voltage to the configuration channel signal that is greater than a disconnect threshold voltage of the configuration channel signal.

2. The USB cable of claim 1 wherein the electronic marker circuit includes a fault control circuit configured to apply the voltage that is greater than at least one-half the value the USB power signal that is applied to the first conductor during normal operation of the USB cable.

3. The USB cable of claim 1 wherein the electronic marker circuit includes a fault control circuit configured to apply the voltage that is greater than at least two and three-quarters of a volt (2.75 V).

4. The USB cable of claim 1 wherein the electronic marker circuit includes a fault control circuit having a transistor with a source coupled to a signal that is representative of the configuration channel signal, a drain coupled to a voltage source, and a gate coupled to enable the transistor in response to the fault control circuit detecting the error condition.

5. The USB cable of claim 1 wherein the electronic marker circuit is configured to apply the voltage to the configuration channel signal for a first time interval that lasts at least two milli-seconds.

6. The USB cable of claim 5 wherein the first time interval is at least twenty-five milli-seconds.

7. The USB cable of claim 1 wherein the error condition is one of the USB power signal having a value that is less than a voltage threshold value, the configuration channel signal having a value that is greater than a first maximum threshold value, a cable power signal having a value that is greater than a second maximum threshold value or an over-temperature condition.

8. The USB cable of claim 1 wherein the electronic marker circuit includes a fault control circuit having a switch coupled to a signal that is representative of the configuration channel signal wherein the fault control circuit enables the switch in response to the fault control circuit detecting the error condition.

9. A method of forming an electronic marker circuit for a USB connector comprising:
forming a fault protection circuit to detect a fault condition on a conductor of a USB cable; and
configuring the fault protection circuit to enable a switch to apply a first signal to a configuration channel signal of the USB bus in response to the fault protection circuit detecting the fault condition, wherein the switch is coupled to a configuration channel that conducts the configuration channel signal and wherein the first signal is representative of a disconnected condition of the USB bus.

10. The method of claim 9 further including forming the fault protection circuit to include a fault detection circuit that is configured to detect the fault condition as one of an over-temperature condition, an overvoltage condition of the configuration channel signal, an overvoltage condition of a USB power signal, or an overvoltage condition of a cable plug power signal.

11. The method of claim 10 further including forming the fault protection circuit to include a fault control circuit configured to drive the configuration channel signal with the first signal in response to the fault detection circuit detecting the fault condition.

12. The method of claim 9 further including configuring the fault protection circuit to apply the first signal as one of a voltage that is greater than 2.75 volts or another voltage that is greater than 1.65 volts.

13. The method of claim 9 further including configuring the fault protection circuit to form a first time interval after detecting the fault condition and to subsequently apply the first signal for a second time interval after expiration of the first time interval.

14. The method of claim 13 further including configuring the fault protection circuit to form the second time interval to be greater than the first time interval and no less than 25 milli-seconds.

15. An electronic marker circuit comprising:
one or more inputs configured to receive one or more signals from a USB bus;

a first input of the one or more inputs configured to receive a configuration channel signal of the one or more signals from the USB bus; and a fault protection circuit configured to drive the configuration channel signal to a value that is greater than a disconnect threshold value of the configuration channel signal, the fault protection circuit configured to drive the configuration channel signal to the value in response to the fault protection circuit detecting a fault condition of the one or more signals from the USB bus wherein the fault protection circuit is configured to substantially continuously drive the configuration channel signal to the value until a USB power signal is removed from the fault protection circuit.

16. The electronic marker circuit of claim 15 wherein the fault protection circuit includes a fault detection circuit configured to receive one or more of the signals from the USB bus and detect the fault condition as one of an over-temperature condition, an overvoltage condition of the configuration channel signal, an overvoltage condition of a USB power signal, or an overvoltage condition of a cable plug power signal.

17. The electronic marker circuit of claim 15 wherein the fault protection circuit is configured to form a first time interval after detecting the fault condition and, after expiration of the first time interval, to subsequently drive the configuration channel signal to the value for a second time interval that is greater than the first time interval.

18. The electronic marker circuit of claim 15 wherein the fault protection circuit is configured to substantially continuously drive the configuration channel signal to the value for no less than 25 milli-seconds.

19. The electronic marker circuit of claim 15 wherein the fault protection circuit includes a transistor having a first current carrying electrode coupled to receive a voltage that is no less than the value, a second current carrying electrode coupled to the configuration channel signal, and a control electrode coupled to receive a signal that is representative of the fault protection circuit detecting the fault condition.

* * * * *